United States Patent [19]

Dickinson

[11] Patent Number: 4,736,539
[45] Date of Patent: Apr. 12, 1988

[54] BUMPER STICKER HOLDER

[75] Inventor: Nathan L. Dickinson, Portland, Oreg.

[73] Assignee: N. L. Dickinson Co., Portland, Oreg.

[21] Appl. No.: 918,048

[22] Filed: Oct. 14, 1986

[51] Int. Cl.$^4$ .............................................. G09F 21/04
[52] U.S. Cl. ........................................ 40/591; 40/200;
 40/209; 40/152.1; 40/10 R
[58] Field of Search .................. 40/591, 209, 606, 211,
 40/124, 124.1, 152, 152.1, 124.4, 156, 158, 611;
 248/476, 291; 293/117; 296/1 C; 362/82

[56] References Cited

U.S. PATENT DOCUMENTS

| 1,741,434 | 12/1929 | Pratt et al. | 40/597 |
|---|---|---|---|
| 1,894,857 | 1/1933 | Dwyer et al. | 40/591 |
| 2,431,108 | 11/1947 | Carleton et al. | 40/591 |
| 2,494,179 | 1/1950 | King | 40/591 |
| 2,675,983 | 4/1954 | King | 40/591 |
| 2,921,395 | 1/1960 | Fishman | 40/209 |
| 3,173,219 | 3/1965 | Yarder | 40/591 |
| 3,510,975 | 5/1970 | Lowmaster | 40/591 |
| 3,918,187 | 11/1975 | Vogele | 40/152.1 |
| 4,073,082 | 2/1978 | McWhorter | 40/591 |
| 4,081,119 | 3/1978 | Messmore | 40/152.1 |
| 4,182,062 | 1/1980 | Krokos et al. | 40/209 |
| 4,314,417 | 2/1982 | Cain | 40/209 |
| 4,453,328 | 6/1984 | Connolly | 40/591 |
| 4,685,785 | 8/1987 | Mundt et al. | 40/152 |

FOREIGN PATENT DOCUMENTS

| 1188461 | 4/1963 | Fed. Rep. of Germany . | |
| 2548776 | 5/1977 | Fed. Rep. of Germany | 362/82 |
| 1411631 | 10/1975 | United Kingdom | 362/82 |
| 2150727 | 3/1985 | United Kingdom . | |

Primary Examiner—Robert Peshock
Assistant Examiner—Michael Lynch
Attorney, Agent, or Firm—Eugene D. Farley

[57] ABSTRACT

A bumper sticker holder comprises a base, base fastening means for fastening the base to an automobile bumper or other support, and a peripheral frame dimensioned to overlie the peripheral area of the base and with it defining a longitudinal guideway dimensioned to receive and mount a bumper sticker or like display item. Frame fastening means fasten the frame to the base. As an alternative application, the base fastening means may be employed as a stand for mounting the holder on a desk or other supporting surface. When combined with suction cup fasteners, the holder may be applied to mounting the display item on the interior of an automobile window or like location.

5 Claims, 2 Drawing Sheets

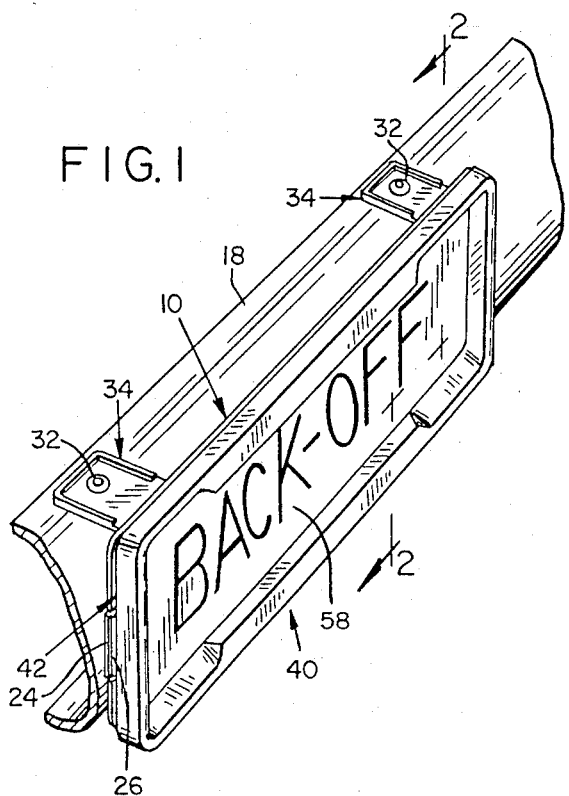
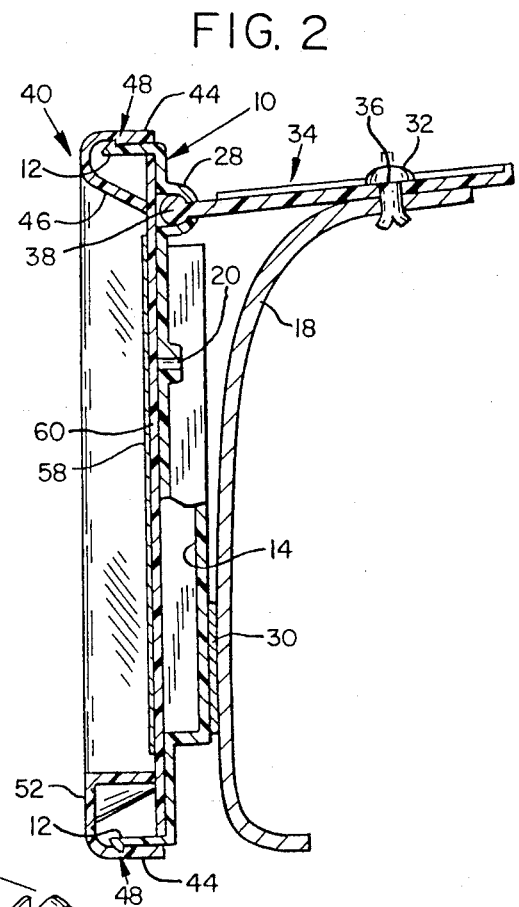
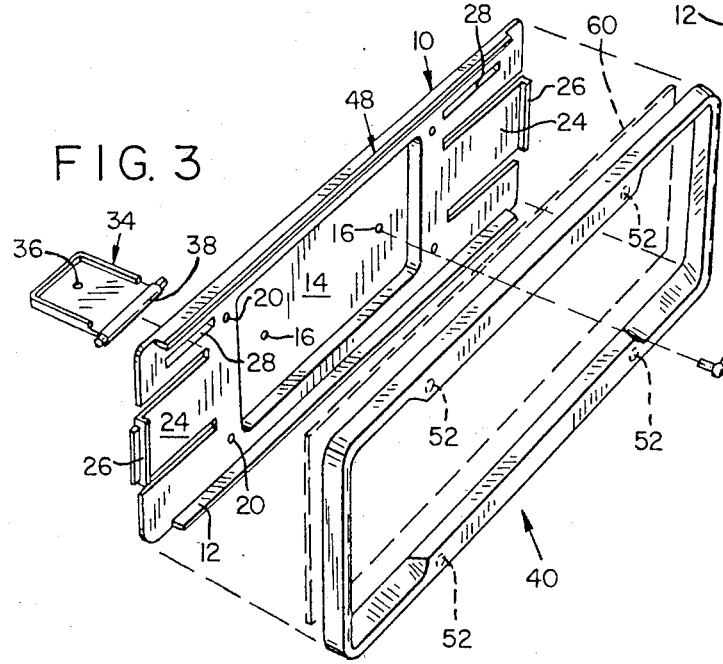
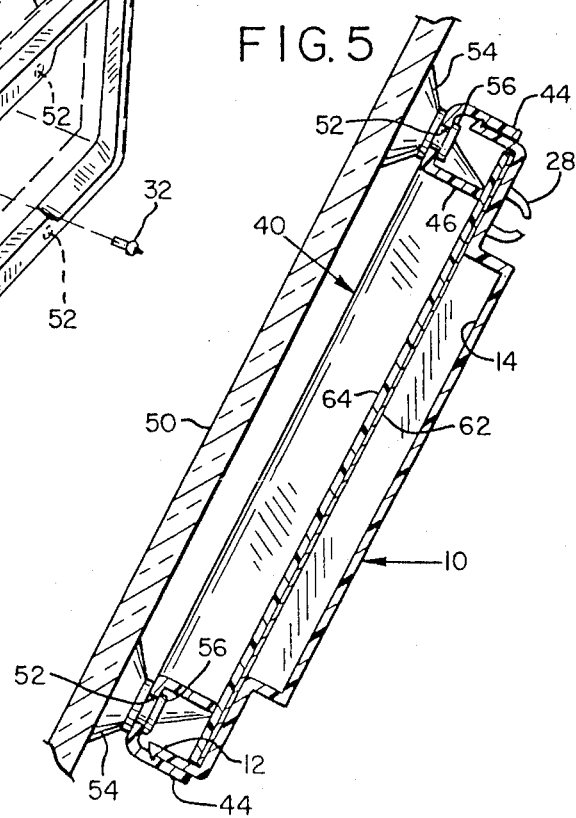

BUMPER STICKER HOLDER

BACKGROUND AND GENERAL STATEMENT OF THE INVENTION

This invention relates to holders for mounting bumper stickers and like display items expressing a motto or comment, on the bumper of an automobile or other support such as the interior surface of an automobile window, or an office desk surface.

Bumper sticker afficionados have need for a holder which will mount and display bumper stickers in a variety of environments, principally on the bumper of an automobile, but also on such support surfaces as car windows, desk tops, counter tops, etc.

It is the general purpose of the present invention to provide such a holder which:

Displays the item attractively on its selected support.
Protects the display item.
Mounts it interchangeably with other selected display items.
Is adaptable universally to mounting the item on a variety of support surfaces, including car bumpers of arcuate or off-set cross sectional configuration.
Protects the displayed item from thievery or loss.
Does not deface the bumper.
Is reasonable in cost, easy to install, and easy to use.

The foregoing and other objects of the invention are achieved by the provision of a bumper sticker holder which, broadly stated, comprises a base and base fastening means for fastening it to an automobile bumper or other selected support. A frame overlies the peripheral area of the base and with it defines a longitudinal guideway. The guideway receives and mounts a bumper sticker or like display item.

Frame fastening means, such as pop rivets or two-sided tape, fasten the base to the bumper. A bracket may also be used for this purpose and serves the dual functions of providing a stand by which the holder may be mounted on a desk top or other flat surface if such a mounting is desired.

A locking device locks the sticker within the frame to prevent pilferage. Suction cups provide an alternate mounting means for attaching the assembly to the interior of an automobile or other window.

THE DRAWINGS

In the drawings:

FIG. 1 is a top perspective view of the bumper sticker holder of my invention shown mounted on the bumper (fragmentary) of an automobile.

FIG. 2 is a transverse sectional view taken along line 2—2 of FIG. 1.

FIG. 3 is a top perspective exploded view illustrating the components of the herein described bumper sticker holder and the manner of their assembly.

FIG. 5 is a transverse sectional view similar to FIG. 2, but illustrating the application of the holder of my invention by means of suction cups to an alternate support, such as the interior surface of an automobile window (fragmentary).

DETAILED DESCRIPTION OF A PREFERRED EMBODIMENT OF THE INVENTION

As indicated above, the bumper sticker holder assembly of my invention essentially comprises a base, a peripheral frame dimensioned to overlie the base, base fastening means for fastening the base to an automobile bumper or other support, and frame fastening means for fastening the frame to the base.

Referring particularly to FIGS. 1, 2 and 3, the base, indicated generally at 10, comprises a flat, preferably rectangular, plate of suitable structural material such as plastic or metal. Its side edges are upturned to form side walls 12. Its end edges are open.

Centrally, base 10 is dished to form a recess 14. This provides part storage during packaging of the assembly. It also provides a flat outside surface designed to lie flat against a supporting surface such as the flat, vertical, outside surface of an automobile bumper, indicated at 18.

Base 10 is symmetrical about its Y-axis and, with one structural exemption, symmetrical also about its X-axis. Accordingly, the holder may be employed in various orientations as required to accommodate various installations.

Figure 7:
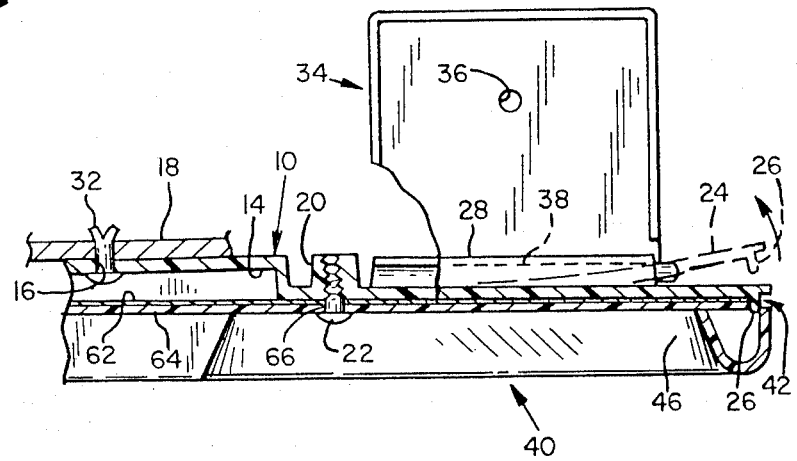
FIG. 7 is a fragmentary, detail sectional view further illustrating the construction and manner of operation of the holder of my invention.

In order to mount the sticker, the base is provided with at least one, preferably four, spaced, tapped and threaded bosses 20, FIGS. 3 and 7. These receive sticker mounting screws 22 which deter unauthorized removal of the sticker from the holder.

Base 10 of the assembly preferably is fabricated from a resilient material. Its respective ends are formed with integral sticker-retainers 24 having upturned ends 26. The resilient retainers thus provided may be displaced to their dashed line positions of FIG. 7 to permit introduction of a bumper sticker into the holder. After such introduction, the retainers snap back to their full line position of FIG. 7, with edge portions 26 preventing withdrawal of the sticker from the holder.

Base 10 is provided further with a plurality of sockets 28 projecting outwardly from its rear face, FIGS. 2 and 3. As will appear hereinafter, these serve a dual purpose: fastening the base to the bumper of a car or other support, or, in the alternative, mounting feet which convert the holder to a display stand for the sticker it contains.

In the illustrated embodiment of the invention, there are two such sockets, one in each corner area of the same side of the base plate. Since the latter is reversible, this makes possible mounting the base in diverse mounting situations.

Various categories of fasteners may be employed to secure base 10 to bumper 18 or other supporting surface.

One such category comprises the two-sided adhesive tape 30 illustrated in FIG. 2.

Another such category comprises the pop rivets 32, also illustrated in FIG. 2.

A third category, of use where the bumper or other support does not have a flat mounting surface, is the bracket indicated generally at 34, FIG. 3.

At its outer end, bracket 34 is provided with means for securing to the bumper. Such means comprises mounting hole 36 dimensioned to receive one of pop rivets 32.

At the opposite or inner end of the bracket, the fastening means comprises an integral cylinder 38. This is designed for insertion in one of sockets 28 in endwise, slide-and-guide relationship. When thus mounted, a pivotal, modified ball-and-socket combination is secured which permits adjustment of the bracket to various angular positions as required to accommodate bumpers of varying contour.

Cooperating with base 10 in the composition of the final holder assembly is a frame indicated generally at 40. This member of the assembly encircles and overlies the peripheral area of the base and with it defines a longitudinal guideway 42 dimensioned to receive and mount a bumper sticker or like display item.

In the illustrated form of the invention, frame 40 comprises an integral piece of molded plastic, reversely bent, as it appears in cross section, to provide an outer longitudinal segment 44 and an inner longitudinal segment 46. Detent means, indicated generally at 48, interengage the inner face of outer frame segment 44 with the outer face of upstanding side edges 12 of base 10.

In the mounted condition of the frame, its inner segment 46 stops short of base 10 to form with the base the guideway 42 which receives the selected bumper sticker for display.

Frame 40 also is provided with attachment means for alternate attachment of the holder assembly to an alternate supporting surface, such as the inside surface of the rear window 50 of an automobile.

To this end, the frame is provided with thinned punch-out areas 52. These may be punched out to provide openings which receive suction cups 54 having bases 56. The bases are deformable so that they may be wedged into the punched-out openings 52, frictionally engaging the suction cups with the frame.

Provision is made for displaying various types of bumper stickers in the holder.

If the bumper sticker comprises a sheet of printed paper or plastic provided with adhesive on its rear surface, indicated at 58 in FIG. 2, the sticker preferably is mounted on a sheet 60 colored black or other solid color as required to give it opacity. The opaque plastic mounting sheet gives the sticker rigidity so that it may be inserted easily in guideway 42, and removed easily therefrom. The opaque quality of the plastic sheet provides an attractive border for the sticker. It also conceals underlying structural members of the holder.

However, if a decal-type bumper sticker 62 is to be displayed, as in FIGS. 5 and 7, then the decal is transferred onto a sheet 64 of clear plastic. This protects the decal while contemporaneously affording the requisite degree of visibility.

In either case, the sheet is formed with openings 66 designed to receive locking screws 22, FIG. 7.

OPERATION

The manner of using the bumper sticker holder of my invention in all its versatile aspects is as follows.

Considering first its application to mounting a sticker on the bumper of an automobile:

If the bumper is vertical and planar, the assembled holder may be attached to the planar surface of the bumper by means of two-sided adhesive tape 30. In the alternative, the bumper may be drilled and the holder attached by means of pop rivets 32 received in openings 16 of base plate 10 of the holder.

If, on the other hand, the bumper is arcuate or stepped in contour, as illustrated in FIGS. 1 and 2, then the manner of mounting the holder, illustrated in the latter Figure, may be employed. The holder is secured to the flat portion of the bumper by means of two-sided adhesive tape 30. Brackets 34 are pivotally mounted in sockets 28, and their outer ends secured to the bumper by means of pop rivets 32.

If a bumper sticker comprising a printed sheet 58 of paper or plastic having adhesive on the reverse side is to be displayed, it first is adherently united to an opaque (preferably black) plastic sheet 60. The assembly then is inserted into the holder via guideway 42, where it is retained by detents 24.

However, if the bumper sticker comprises a decal 62, it is transferred to a clear plastic sheet 64, which then is mounted in guideway 42 in the indicated manner.

Considering next the situation in which it is desired to use the holder in a display window:

This situation is illustrated in FIG. 5. Punch-outs 50 in frame 40 are opened and the bases 56 of suction cups 54 inserted in the openings. The display item then may be mounted in the holder in the manner described above and the holder attached by the suction cups to the inside of a window 50, for example the rear window of an automobile, or a store front window.

Figure 4:
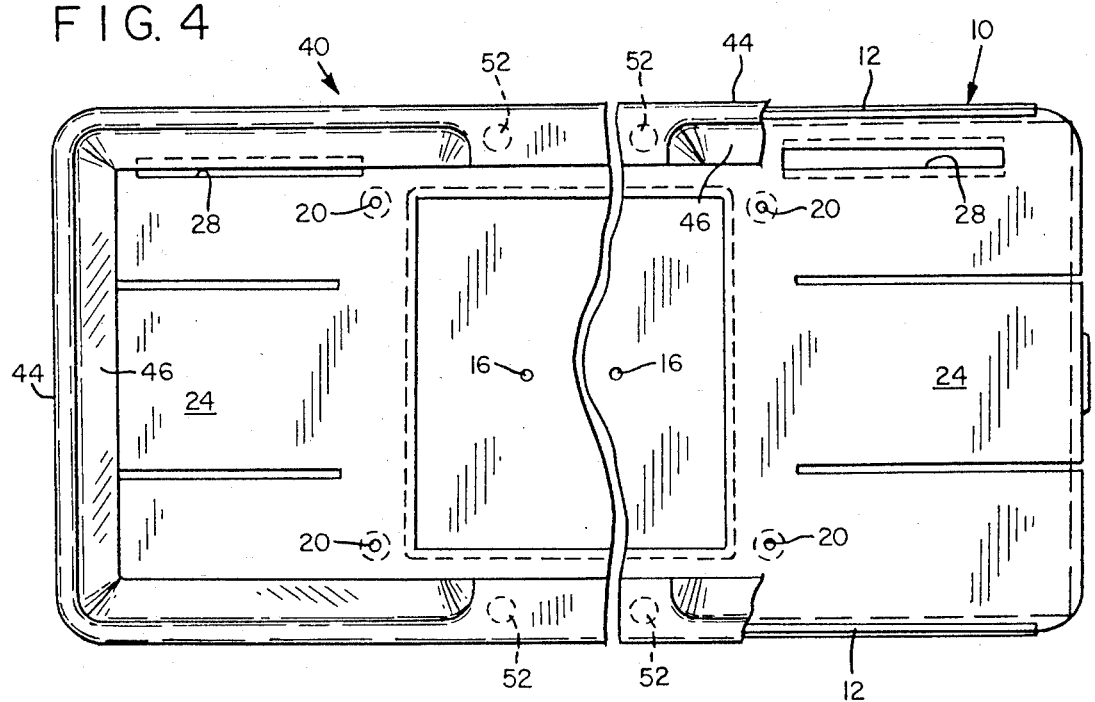
FIG. 4 is a foreshortened plan view of the holder, partly broken away better to show interior construction.
Figure 6:
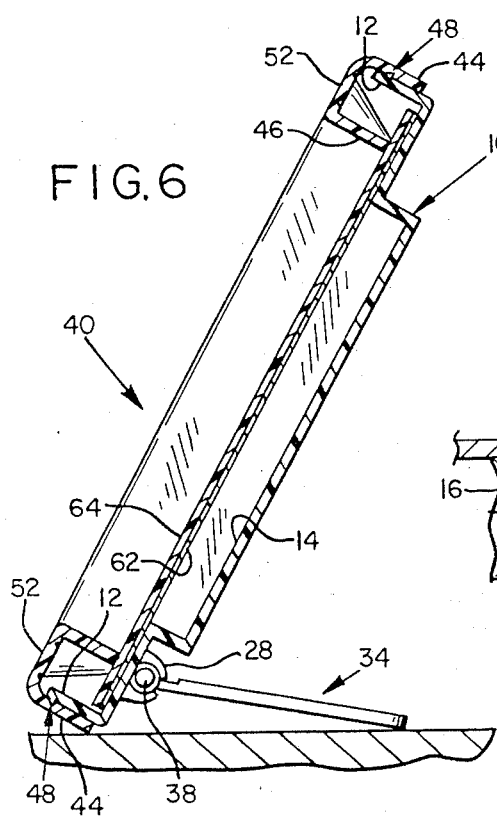
FIG. 6 is a transverse sectional view of the holder of my invention similar to FIGS. 2 and 5, but illustrating the application of the holder in still another environment, i.e. as a display stand supported on a desk top (fragmentary) or other selected horizontal support surface.

Considering next the situation in which it is desired to use the holder as a display stand:

This situation is illustrated in FIG. 6. Brackets 34 are inserted in sockets 28 and adjusted to the desired angle. The brackets then serve as feet, supporting the holder for easy visibility of its contents.

In all situations the sheet and the sticker which it mounts may be locked releasably in position by the application of one or more locking screws 22 penetrating opening 66 in the sheet and tapped bosses 20 in the base.

Having thus described in detail a preferred embodiment of the present invention, it will be apparent to those skilled in the art that various physical changes could be made in the device described herein without altering the inventive concepts and principles embodied. The present embodiment is therefore to be considered in all respects as illustrative and not restrictive, the scope of the invention being indicated by the appended claims rather than by the foregoing description. All changes which come within the meaning and range of equivalency of the claims are therefore to be embraced therein.

I claim:

1. A bumper sticker holder, comprising:
    (a) a base having a pair of laterally spaced, longitudinally extending slits extending inwardly from at least one longitudinal end forming between them a resilient sticker retainer tab having an upturned outer end,
    (b) base fastening means on the base for fastening it to an automobile bumper or other support,
    (c) a peripheral frame separate from the base dimensioned to overlie the peripheral area of the base and with it to define a longitudinal guideway dimensioned to receive and mount a bumper sticker or like display item, the longitudinal guideway being open at the end adjacent the resilient sticker retainer tab, and (d) frame fastening means for detachably fastening the frame to the base, whereby with the frame fastened to the base, a bumper sticker may be inserted through the open end of the guideway fully into the guideway between the frame and the base and retained therein by releasable interception of the open end of the guideway by the upturned outer end of the resilient retainer tab on the base.

2. The bumper sticker holder of claim 1 wherein the base comprises a substantially flat base with upturned opposite side edges, and detent means on said side edges and frame detachably interconnecting the base and the frame.

3. The bumper sticker holder of claim 1 wherein the resilient sticker retainer tab is included on each opposite longitudinal end of the base, and said lognitudinal guideway is open at each opposite end, each open end being releasably intercepted by the upturned outer end of the resilient sticker retainer tab associated with that end.

4. The bumper sticker holder of claim 1 wherein the frame is of inverted U-shape in cross section defining inner and outer peripheral walls interconnected by an intermediate wall, the base includes upturned opposite side walls detachably engaging the associated portions of the outer peripheral wall, the inner peripheral wall terminating a spaced distance from the base for reception therebetween of a bumper sticker, the upturned opposite side walls of the base confining and guiding a bumper sticker inserted through the open end of the guideway.

5. A bumper sticker holder comprising:
(a) a base,
(b) a frame dimensioned overlie the peripheral area of the base and with it to confine therebetween a bumper sticker or like display item,
(c) frame fastening means for detachably fastening the frame to the base,
(d) bracket means on the base for supporting the base in an upstanding position on a horizontal support,
(e) an elongated cylindrical ball member on one of said base and bracket means, and
(f) an elongated socket member on the other of said base and bracket means, the socket member being of arcuate cross section configured to detachably receive the cylindrical ball member frictionally therein for detachably securing the bracket means to the base for relative angular adjustment.

* * * * *